No. 862,286. PATENTED AUG. 6, 1907.
L. S. SCHOENFELD.
FILTER PRESS.
APPLICATION FILED JULY 27, 1906.
3 SHEETS—SHEET 1.
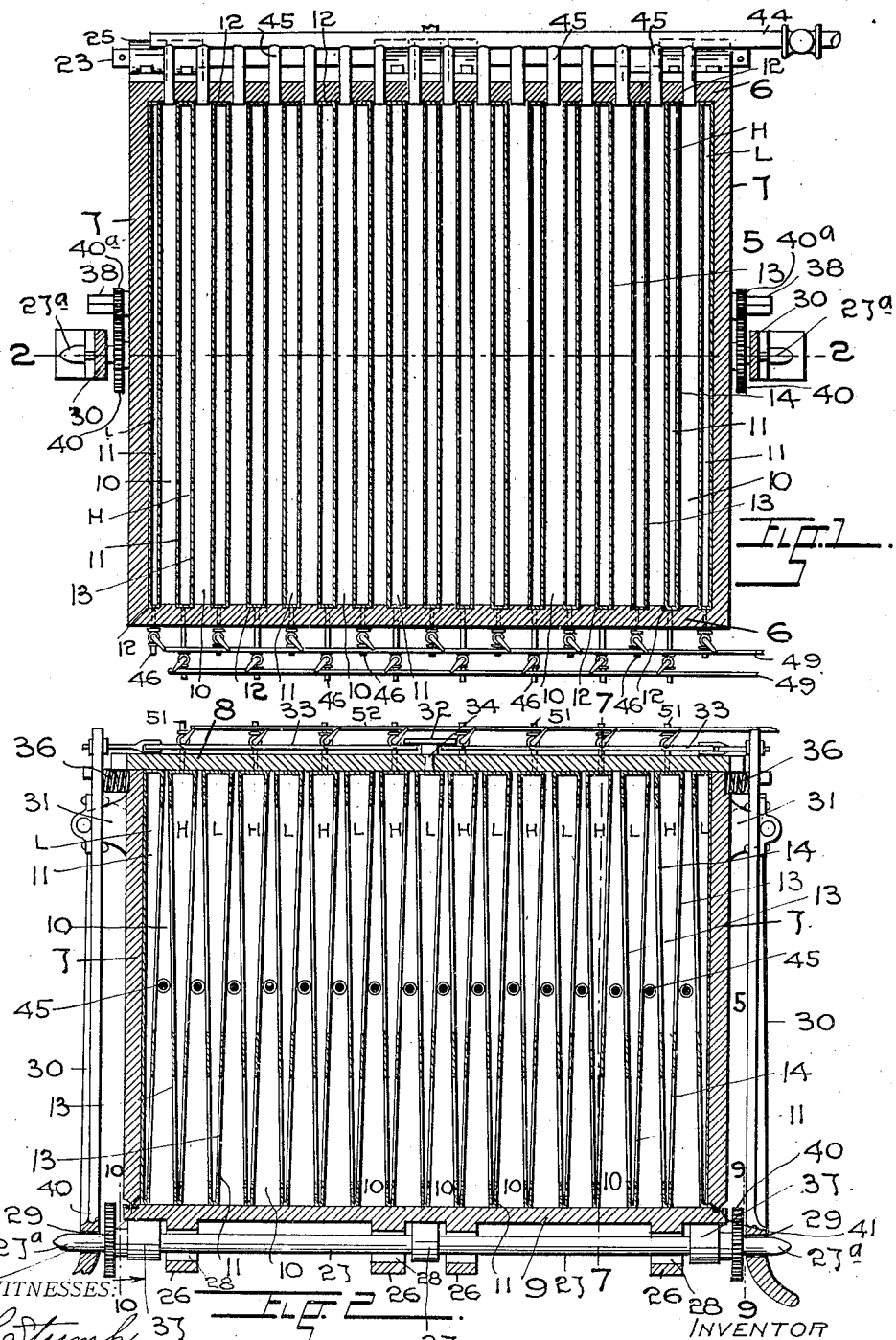
WITNESSES:
INVENTOR
BY Laurence S. Schoenfeld
ATTORNEY.

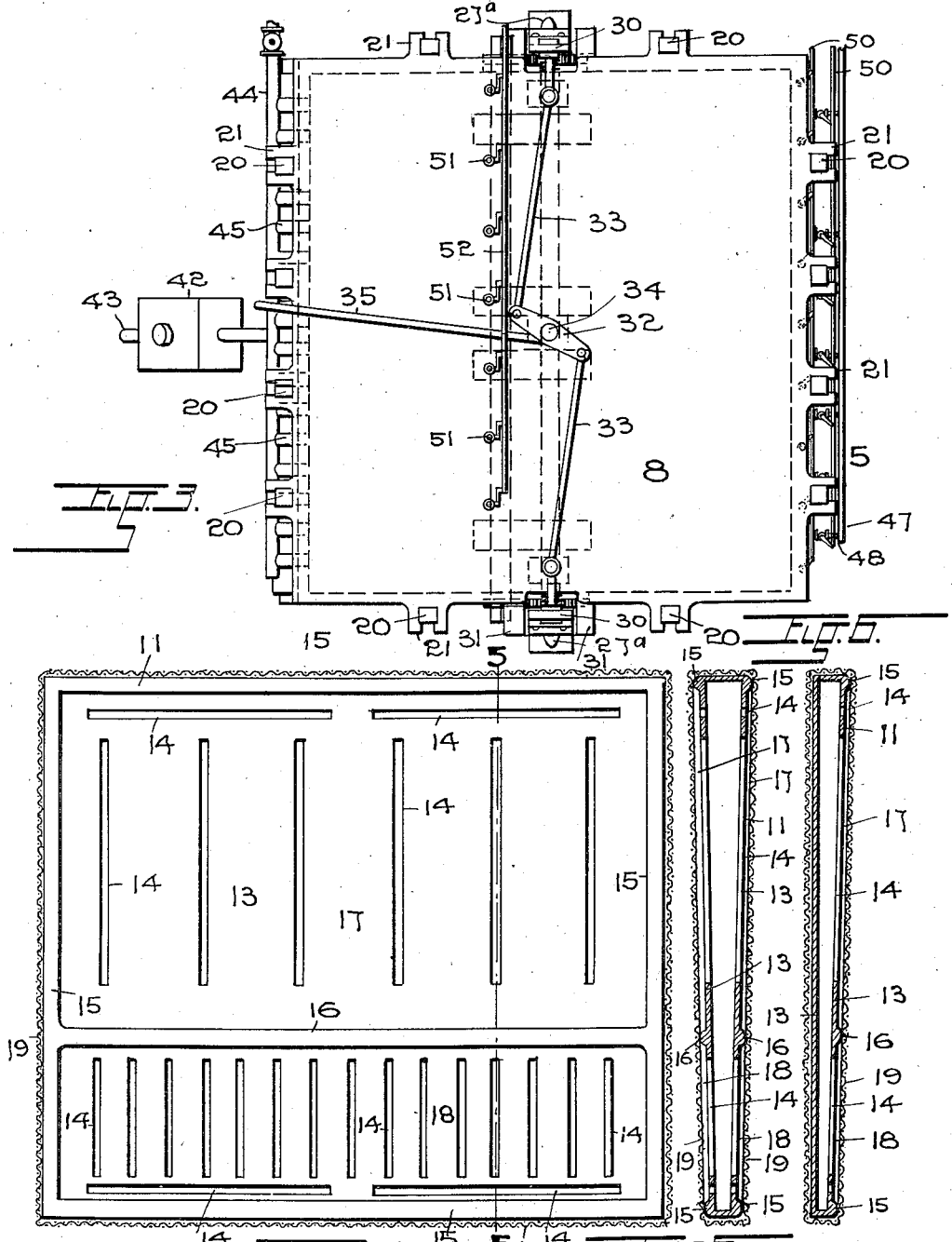

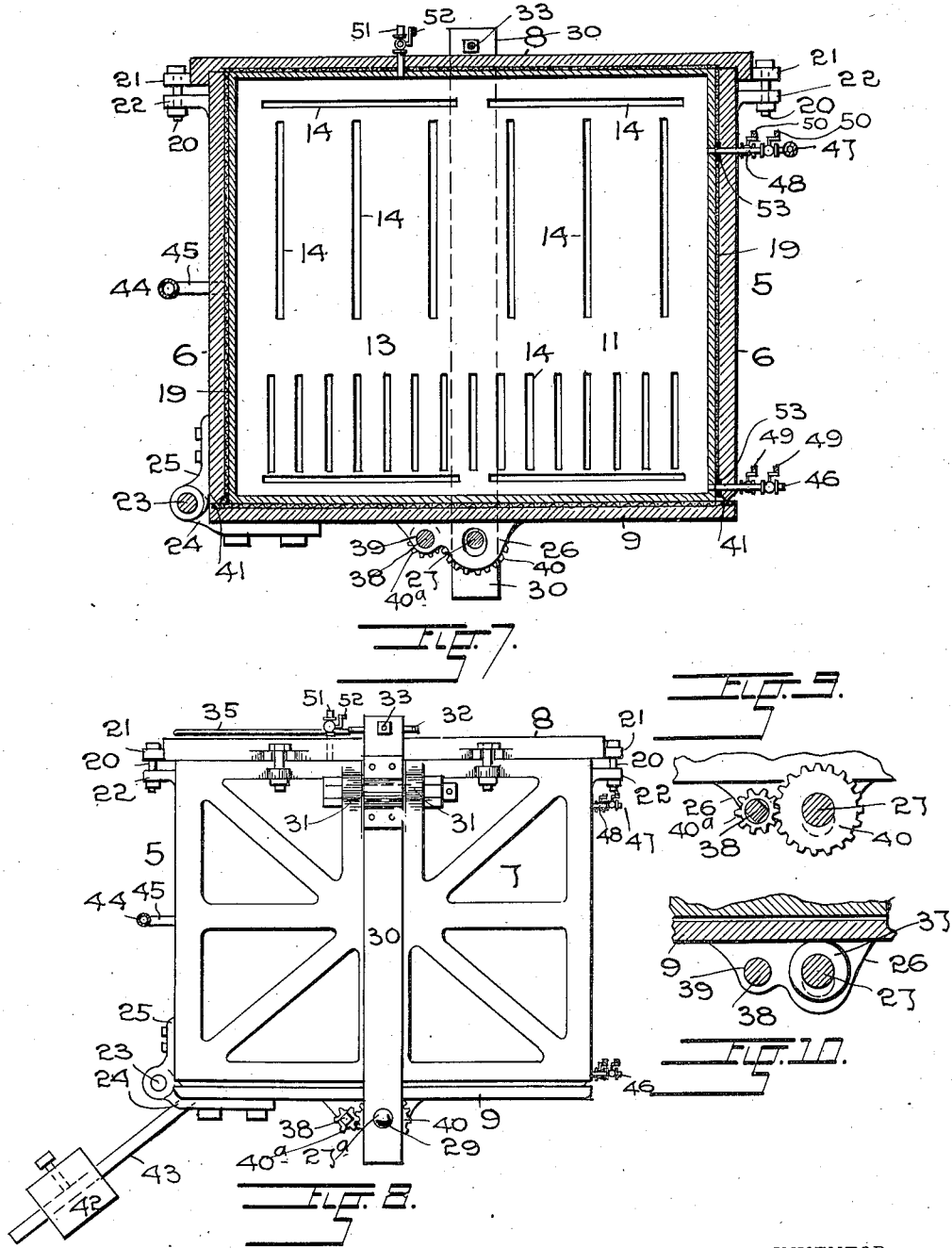

UNITED STATES PATENT OFFICE.

LAURENCE S. SCHOENFELD, OF JAMESTOWN, COLORADO.

FILTER-PRESS.

No. 862,286.          Specification of Letters Patent.          Patented Aug. 6, 1907.

Application filed July 27, 1906. Serial No. 328,038.

*To all whom it may concern:*

Be it known that I, LAURENCE S. SCHOENFELD, a citizen of the United States of America, residing at Jamestown, in the county of Boulder and State of Colorado, have invented certain new and useful Improvements in Filter-Presses, of which the following is a specification.

My invention relates to the class of devices commonly known as filter-presses and which are employed either to separate the liquid from the solid matter contained in a mixture, to wash solids by permeation of suitable liquids or to defecate liquids by forcing them through a cleansing medium.

The object of my invention is to provide a device of the class named which being simple in construction, may be produced at low cost, is easily operated, and rapidly and efficiently performs the functions for which it is intended.

My invention furthermore contemplates the provision of a filtering press, which obviating extension or separation of its parts to discharge the solid residuum, may be operated on a minimum of floor space, and which by reason of the simplicity of its construction and action, saves time, labor and expense of installation and operation.

I attain these objects by the mechanism illustrated in the accompanying drawings in the various views of which like parts are similarly designated and in which Figure 1— represents a central, horizontal section through the device, Fig. 2— a central, vertical section taken along a line 2—2, Fig. 1, Fig. 3— a plan view drawn to a reduced scale, Fig. 4— an enlarged face view of one of the filtering frames or plates employed in my construction, Fig. 5— a vertical cross section taken along a line 5—5, Fig. 4, Fig. 6— a similar section through one of the two end plates employed in my press, Fig. 7— a vertical cross section along a line 7—7, Fig. 2, Fig. 8— an end view of the press, Fig. 9— a section along a line 9—9, Fig. 2, looking towards the press and Fig. 10— a vertical section along a line 10—10, Fig. 2, looking in the direction of the arrow.

Referring to the drawings 5 designates a preferably rectangular box, comprising the normally vertical sides 6 and the therewith integral ends 7 and provided at its upper side with a detachable lid or cover 8 and at its opposite or under side with a hinged door 9, the construction and operation of which will hereinafter be described.

The interior of the receptacle is divided into a plurality of compartments or chambers 10 by a number of vertically disposed, equidistantly spaced, wedge shaped partitions 11, which, extending transversely within the box, are held in opposite guide ways 12 in the inner surfaces of the sides 6 and normally in contiguous relation to the lid 8 and the bottom door 9.

The wedge shaped partition 11, constituting the filtering frames or plates as they are commonly called in the art to which this invention pertains, are hollow, while their downwardly converging sides 13 are provided with a plurality of elongated ports or slots 14, through which the liquid contained in the solution passes from the compartments 10 into the interior of the plates. The exterior surfaces of the apertured sides of frames 11 are bounded by marginal ribs 15 and divided by a transverse rib 16, into two sections 17 and 18, the upper one of which exceeds the lower one in area, while the total area of the openings in each section is substantially equal to that in the other.

In practice when the filtering frames are in operative position in box 5, they are enveloped in or covered by filter cloth 19, composed of duck or other suitable fabric, as illustrated in Figs. 4, 5, 6 and 7. This cloth being stretched across the outer surface of the converging sides 13 engages ribs 15 and 16 and thus effectively separates the two sections 17 and 18. The compartments formed between the opposite downwardly diverging sides of each two plates, are obviously wedge shaped and the lower portions of the cakes of solid matter formed in the chambers during the operation of the device are in consequence thicker than the upper parts which therefore are more readily permeated by the liquid forced from the interior of the plates 11 through the compartments.

The division of the apertured surfaces of the plates into two sections as hereabove described, effectively compensates for the uneven permeability of the cakes by equalizing the amount of water passing through the vertically largest part of the compartment extending above ribs 16, and the shallower but wider portion extending below the same.

The filter plates employed in the device are of uniform shape and size with the exception of the two end ones, the non-apertured outer surface of each of which extends at right angles to its upper and lower sides and is, in practice, perpendicular to engage the inner surface of the adjacent ends 7 of case 5.

To avoid confusion, in the drawings, the filter cloth has been omitted in Figs. 1 and 2.

The lid or cover 8 is secured to the box by means of a plurality of bolts 20 which extending through correspondingly disposed, outwardly projecting lugs 21 and 22 respectively on the lid and the adjacent portion of the box, provide an impervious connection. The bottom plate or door 9, which normally closes the underside of the box and which, in practice, is employed to discharge the cakes of solid matter from the chambers 10, is hinged along the lower edge of one of the sides 6 of the receptacle 5, by means of a pin 23 projecting through alined apertures in the knuckles 24 and 25 disposed alternately along one of the edges of the door and the adjacent side of the box. Plate 9 is furthermore provided with a plurality of axially alined bearings 26, which support a shaft 27, disposed in parallel relation to the hinged edge of the door. The openings 28 in the bearings are oblong to permit vertical displacement of the shaft.

The extremities 27ᵃ of shaft 27, which extend beyond the edges of the door project, when the latter is in the closing position, through diametrically corresponding apertures 29 in the lower ends of vertically disposed hangers 30, fulcrumed in proximity to the upper edges of the box in brackets 31 which, project laterally from the end plates 7. The lower extremities of hangers 30, below apertures 29, curve outwardly to facilitate the automatic insertion of the tapering shaft ends, while their opposite or upper extremities, extending above the upper surface of cover 8, are connected with a double crank 32, by means of rods 33. Crank 32 is pivotally mounted on lid 8 by means of vertically extending pin 34 and is provided with a hand rod 35 which extends laterally beyond the edge of the cover. The double toggle-joint thus produced, permits the operator to draw the upper extremities of the hangers together and in consequence, disengage their opposite ends from the shaft 27, when it is desired to open door 9.

Helical springs 36, disposed above the fulcrum between the hangers and the ends of case 5, tend to retain the former in their normal or perpendicular position. A plurality of eccentric cams 37 on shaft 27 are adapted to engage the outer surface of plate 9 and thereby force the latter against the lower edges of the sides and ends of box 5, when the shaft supported by hangers 30 and vertically movable in bearings 26, is rotated. The leverage required to thus clamp the door by rotation of the shaft, is provided by means of a second shaft 38 mounted in alined apertures 39, in bearings 26, in parallel relation to the cam shaft and having pinions 40ᵃ in proximity to its extremities, which engage gear wheels 40 mounted in contiguous position on shaft 27. The outer extremities of shaft 38, which extend beyond the edges of the box, are squared for the appliance of a crank, wrench or other suitable lever.

To assure a water tight joint between the door and the box, the vertical sides of the latter are chisel-edged and in practice, engage an elastic gasket 41, embedded in a recess formed for the purpose in the inner surface of the door.

The closing of the door is materially facilitated by a counter poise 42, adjustably held on an arm 43, which extends in oblique direction from the hinged edge of the door.

From the foregoing description, the operation of opening and closing the bottom plate 9 will be readily understood.

When it is desired to discharge the contents of chambers 10, the operator, as heretofore explained, disengages the ends of shaft 27, from the hangers and thus causes the door to turn about its hinges by reversing the position of hand rod 35. To re-close the door, it is raised until the pointed extremities of shaft 27 which, engaging the outwardly curving lower ends of hangers 30, cause them to move outwardly, have entered the apertures 29, when the springs 36 return the hangers to the perpendicular position, and the door is supported as before. By rotating shafts 38 and 27 the cams are subsequently brought to engage the surface of the door and the latter is pressed against the V-shaped edges of the vertical sides of the box as heretofore described.

The solution to be treated is forced into the press by means of a valve-controlled feed pipe 44 extending parallelly to the side of the box and which connects with the compartments 10 by means of branch pipes 45. The filtrate entering the cavities in the filter plates is expelled through valve-controlled discharge pipes or outlets 46 which communicate with apertures in the lowermost portion of plates 11.

The process of washing the cakes of solid matter formed in the compartments, is performed by means of a conduit 47 which connects with the interior of the filter plates near the top by means of valve-controlled branch pipes 48. The filter plates are divided into two series, the respective members of which alternate and which are known as the low-pressure and high-pressure plates. Thus, in the construction shown in the drawings, the first, third, fifth, etc., plates are the low-pressure plates, while the alternate, second, fourth, etc., members are the high-pressure plates. The valves 46 and 48, communicating with the interior of the plates comprised in each series are respectively connected by means of rods 49 and 50, so that the outlets and inlets of each series may be simultaneously opened or closed independent from those in the other. The device is furthermore provided with a series of outlet pipes 51, the cocks of which are connected by a rod 52 and which, extending through the cover 8, communicate with the uppermost part of the cavities in the high-pressure plate. To prevent leakage at the juncture of the apertured plates and the ends of the in- and outlet pipes, the latter may be surrounded by gaskets 53, which to this end, are embedded in recesses in the inner surface of the sides 6 and the cover 8.

Having thus described the mechanical construction of my improved filter press, its operation is as follows:—The cloth covered filter plates having been placed in position in the guide ways 12, cover 8 is securely fastened by means of bolts 20 and the bottom plate or door 9 tightened against the lower edges of the receptacle by rotation of shaft 38 as heretofore described. The valves in pipes 48 of the two series of plates are now closed, those in the outlet pipes 46 opened and the solution forced into the compartments 10 through pipes 44 and 45, by atmospheric or mechanical pressure. By reason of the continued compression of the solution, the liquid is forced through the filtering cloth into the interior of the filter plates, while the residuum or solid matter contained in the solution collects in the spaces between the plates, from where it is subsequently discharged in the form of cakes. The filtrate, entering the cavities of the filter plates, is at once discharged through the open outlet pipes and the feeding of the solution into pipe 44 is continued until cessation of the flow of filtrate indicates that the compartments are filled. The valves in pipes 46, leading into the high-pressure plates (designated H in the drawings) are now closed, while those in the alternate or low-pressure plates, L, are left open and the cocks in the water feed pipes 48, communicating with the high-pressure plates are opened preceding the process of "washing" the cakes in chambers 10. The "wash water" employed to this end, is forced through pipe 47 until the interior of the high-pressure plates is completely filled, which is indicated by an efflux of water through the pipes 51 in the top of the device. These outlets are subsequently closed and the washing process continued, to force the wash water from the high-pressure plates through the cakes contained in chambers 10 into the low-pressure plates to be emitted through pipes 46. This concludes the process of separating the liquids from the solids contained in the solution and the cocks in the water feed pipes 48 and the discharge pipes 46 are now opened in both the high-pressure and low-pressure series of plates and water forced into pipe 47 for the purpose of freeing the residuum from the cloth and washing the latter prior to the discharge of the cakes. This final action is accomplished by opening the bottom plate or door 9 and permitting the cakes to drop out of the compartments into a subjacent chute or other receptacle.

The methods practiced by means of my improved filter press, to wash solids with liquids or to clarify liquid by forcing them through a purifying agent contained in the compartments, being in principle the same as the above described process of separating liquids from solids, are obvious and further explanation is, in consequence, omitted.

I wish it further understood that variations in details of construction or arrangement of the various parts of the apparatus as described, may be availed of within the principle of my invention.

What I claim is:—

1. In a filter press, a series of perforated hollow filter members, spaced in unchanged relation to each other during the entire cycle of operations, means to feed matter into the intermediate spaces, means to discharge fluids from the interior of the members and means for discharging the residue from the spaces.

2. In a filter press, a series of perforated, hollow filter members spaced in unchanged relation to each other during the entire cycle of operations, means to feed matter into the intermediate spaces, means of discharge from the interior of the said members, and means to feed fluid thereinto.

3. In a filter press, a series of filter members spaced in constantly fixed relation to each other, means to feed matter independently into each intermediate space, and means to discharge the contents of all the spaces simultaneously without altering the relative position of the said members.

4. In a filter press, a series of filter members spaced in unchanged relation to each other during the entire cycle of operations, means to feed matter into the intermediate spaces, and means to feed and discharge fluid into and from each member.

5. In a filter press, a series of filter members spaced in unchanged relation to each other during the entire cycle of operations, means to feed matter into the intermediate spaces, and means to simultaneously feed and discharge fluid into and from each series of alternate members.

6. In a filter press, a series of filter members spaced in unchanged relation to each other during the entire cycle of operations, means to feed matter into the intermediate spaces, means to feed and discharge fluid into and from the interior of the members and means to cause emission of surplus fluid therefrom.

7. A filter press, comprising in combination, a casing, a plurality of filter members dividing its interior into a series of individually inclosed compartments, means to feed matter thereinto, and means on the said casing to discharge the contents thereof without changing the relative position of the said members.

8. A filter press comprising in combination, a casing, a plurality of filter members having downwardly converging sides, dividing its interior into a series of compartments, means to feed matter thereinto, and means to discharge the contents thereof.

9. A filter press comprising in combination, a casing, a plurality of filter members dividing its interior into a series of compartments, and having downwardly converging sides divided into equally perforated, separated sections of unequal area, means to feed matter into the compartments, and means to discharge the contents thereof.

10. A filter press comprising in combination, a casing, a plurality of filter members dividing its interior into a series of compartments, and having downwardly converging sides divided into equally perforated inwalled sections of unequal area, filters engaging the said walls and spaced from the surface of the sides, means to feed matter into the compartments, and means to discharge the contents thereof.

11. A filter press comprising in combination, a casing, a plurality of hollow filter members dividing its interior into a series of compartments, means to feed matter thereinto, means to discharge the contents thereof, the said casing being provided with inlets and outlets for fluid, communicating with the interior of the members.

12. A filter press comprising in combination, a casing, a plurality of filter members dividing its interior into a series of compartments, means to feed matter thereinto, means to discharge the contents thereof, valve-controlled inlets and outlets for fluid in the said casing, communicating with the interior of the members, means to simultaneously operate the valves on the inlets or on the outlets communicating with each series of alternate members, and valve controlled outlets communicating with the uppermost portion of the members.

13. A filter press comprising in combination, a casing, a plurality of filter members dividing its interior into a series of compartments, a hinged lid on the said casing, means to automatically secure the lid in its closed position, and means to force it against the adjacent edges of the casing.

14. A filter press comprising in combination, a casing, a plurality of filter members dividing its interior into a series of compartments, a hinged lid on the said casing, a shaft rotatably mounted on the lid to be laterally movable, cams on the said shaft adapted to engage the lid, hangers fulcrumed on the casing, and arranged to support the extremities of the shaft, and means to disconnect the hangers from the shaft.

15. A filter press comprising in combination, a casing, a plurality of filter members dividing its interior into a series of compartments, a hinged lid on the said casing, hangers fulcrumed on the said casing, and adapted to automatically engage projections on the said lid to secure it in its closed position, and means to disconnect the hangers from the said projections.

16. A filter press comprising in combination, a casing, a plurality of filter members dividing its interior into a series of compartments, a hinged lid on the said casing, a shaft rotatably mounted on the lid, cams on the said shaft, hangers fulcrumed on the casing and adapted to support the extremities of the shaft, and a shaft rotatably mounted on the lid in geared connection with the cam shaft.

17. A filter press comprising in combination, a casing, a plurality of filter members dividing its interior into a series of compartments, a hinged lid on the said casing, a shaft rotatably mounted on the lid, cams on the said shaft, hangers fulcrumed on the casing and adapted to support the shaft at their lower extremities and a toggle appliance connecting their opposite extremities.

18. A filter press comprising in combination, a casing, a plurality of filter members dividing its interior into a series of compartments, a hinged lid on the casing, a shaft rotatably mounted on the lid, cams on the said shaft, hangers fulcrumed on the casing and adapted to support the shaft at one of their extremities, and means to converge their opposite ends.

In testimony whereof I have affixed my signature in presence of two witnesses.

LAURENCE S. SCHOENFELD.

Witnesses:
G. J. ROLLANDET,
B. B. ORMSBY.